United States Patent
Khan

(10) Patent No.: US 7,485,403 B2
(45) Date of Patent: Feb. 3, 2009

(54) LASER-MARKABLE COMPOSITIONS

(75) Inventor: Nazir Khan, Nottingham (GB)

(73) Assignee: Datalase Ltd., Cheshire (GB)

( * ) Notice: Subject to any disclaimer, the term of this patent is extended or adjusted under 35 U.S.C. 154(b) by 860 days.

(21) Appl. No.: 10/380,381

(22) PCT Filed: Mar. 18, 2002

(86) PCT No.: PCT/GB02/01250

§ 371 (c)(1), (2), (4) Date: Mar. 14, 2003

(87) PCT Pub. No.: WO02/074548

PCT Pub. Date: Sep. 26, 2002

(65) Prior Publication Data

US 2003/0180660 A1  Sep. 25, 2003

(30) Foreign Application Priority Data

Mar. 16, 2001 (GB) ................................. 0106603.4
Apr. 3, 2001 (GB) ................................. 0108360.9

(51) Int. Cl.
G03F 7/00 (2006.01)
C08K 3/10 (2006.01)

(52) U.S. Cl. .................... 430/270.1; 430/292; 430/320; 524/406

(58) Field of Classification Search ................. 524/406
See application file for complete search history.

(56) References Cited

U.S. PATENT DOCUMENTS

| | | | | |
|---|---|---|---|---|
| 4,259,491 A | * | 3/1981 | Kroenke | 546/8 |
| 4,762,700 A | | 8/1988 | Huggins | |
| 4,835,133 A | | 5/1989 | Yanagihara et al. | |
| 5,035,983 A | * | 7/1991 | Kiyonari et al. | 430/346 |
| 5,063,137 A | | 11/1991 | Kiyonari et al. | |
| 5,578,120 A | | 11/1996 | Takahashi et al. | |
| 5,626,966 A | | 5/1997 | Kulper et al. | |
| 5,928,842 A | * | 7/1999 | Shinmoto et al. | 430/346 |
| 2005/0032957 A1 | * | 2/2005 | Khan et al. | 524/406 |

FOREIGN PATENT DOCUMENTS

| | | |
|---|---|---|
| EP | 0 105 451 A2 | 3/1984 |
| EP | 0389113 A2 | 2/1990 |
| EP | 0 447 032 A2 | 9/1991 |
| EP | 0 766 546 B1 | 9/1997 |
| JP | 63 209889 A | 12/1988 |
| JP | 05 057463 | 3/1993 |
| JP | 07 052536 | 8/1993 |
| JP | 09 263668 A | 10/1997 |
| JP | 11029711 A * | 2/1999 |
| WO | WO 94/12352 A1 | 6/1994 |
| WO | WO 01/23189 A1 | 4/2001 |

OTHER PUBLICATIONS

Machine Translation of JP11-029711 A, Feb. 2, 1999.*
Machine-Assisted Translation of JP 11-029711 A, Feb. 2, 1999.*
Database WPI, Section Ch, Week 1999915, Derwent Publications Ltd., London, GB; AN 1999-175761 & JP 11 029711 A (Nippon Pelnox KK, Feb. 2, 1999).
Database WPI, Section Ch, Week 199325, Derwent Publications Ltd., London, GB, AN 1993 and SU 1 743 896 A (As Belo Gen Inorg Chem Inst, Jun. 30, 1992, abstract).
Database WPI, Section Ch, Week 199208, Derwent Publications Ltd., London, GB, AN 1992-062857 and SU 1 650 477 A (As Belo Gen Inorg C, May 23, 1991, abstract).
Database WPI, Section Ch, Week 198232, Derwent Publications Ltd., London, GB, AN 1982-66592E and JP 57 105393 A (Toppan Printing Co. Ltd., Jun. 30, 1982, abstract).
Kennelly, William et al. (Mar. 13, 2000) In: Molybdates as a Component of Low Smoke, High Performance Plastics (9 pages).
Kennelly, W.J. and Moore, F.W. (May/Jun. 1990) "Color Stability of Rigid PVC with Molybdates" published in the periodical *Plastic Compounding* 13(3):48-49.
MA. Eikoh (May 1964) "The Thermal Decomposition of.Ammonium Polymolybdates. II" *Bulletin of the Chemical Society of Japan* 37(5):648-653.
Climax Molybdenum, A Phelps Dodge Company. Datasheet Ammonium Octamolybdate (AOM-WA), Mar. 1999. Cas No. 12411-64-2 EINECS No. 2356506.
Climax Molybdenum, A Phelps Dodge Company. Datasheet Ammonium Heptamolybdate (AHM). Mar. 2001. Cas No. 12054-85-2.
Carbon dioxide laser—Wikipedia, the free encyclopedia (last modified on May. 21, 2007).

* cited by examiner

*Primary Examiner*—Vasu Jagannathan
*Assistant Examiner*—Vickey Ronesi
(74) *Attorney, Agent, or Firm*—Saliwanchik, Lloyd & Saliwanchik

(57) ABSTRACT

A laser-markable composition comprises a binder and an oxyanion of a multivalent metal.

4 Claims, No Drawings

LASER-MARKABLE COMPOSITIONS

This application is a National Stage Application of International Application Number PCT/GB02/01250, published, pursuant to PCT Article 21(2).

FIELD OF THE INVENTION

This invention relates to a composition that can be extruded or formulated as a lacquer and is also capable of being printed by use of a laser.

BACKGROUND OF THE INVENTION

Various proposals have been made, in order to achieve effective printing on a substrate, by causing a change of colour in the substrate on which the printing is to appear. Various pigments have been proposed, which can be used to mark a substrate on the application of laser energy. Some of these proposals may be found in, for example, WO-A-00/43456, JP-A-11001065, EP-A0522370, EP-A-0797511, U.S. Pat. Nos. 5,053,440, 5,350,792 (a plastics moulding composition comprising a polyoxymethylene and animal charcoal), U.S. Pat. Nos. 5,928,780, 6,017,972 and 6,019,831. 5,489,639 and 5,884,079 disclose that copper hydroxy phosphate is a laser-markable material.

Ammonium octamolybdate, having the formula $(NH_4)_4Mo_8O_{26}$ and abbreviated herein as AOM, is a readily available material that has fire-retardant properties. For this purpose, it has been formulated with polymers such as polyvinyl chloride (PVC). For example, PVC-containing cables may contain AOM as a smoke-suppressing agent. AOM is an example of an oxyanion of a multivalent metal; many compounds of this type exist in coloured lower valence or non-stoichiometric states.

Printing on packaging such as cartonboard is of considerable commercial importance. This may be simply to provide visible information to a person handling the packages, but is also required for bar-coding and other marking that is intended to be read by machine. This entails two particular problems.

Firstly, the most economical packaging material tends to be brown or some other indeterminate colour, against which bar-coding in, say, black has low contrast (typically grade C or D). Secondly, because of the need to customise packaging, there is wastage involved in printing information on packaging that has to be adapted for each particular customer.

SUMMARY OF THE INVENTION

It has been found that many oxyanions in combination with polymer binders absorb at the wavelength of $CO_2$ laser light (10,600 nm) and undergo a colour change due to a change in oxidation state, but are not affected by ultraviolet light (commonly used for polymer curing) or by the temperatures, typically around 200-300° C., used in extrusion. AOM behaves in this way. It is thus effectively laser-selective, and provides a very suitable material for use in inks intended for application to surfaces which may be required to undergo a heat treatment or for incorporation into polymer extrusions, and be marked by the application of laser light.

According to one aspect of the present invention, an ink composition comprises:

a solvent;

a binder, preferably but not essentially having a labile group; and an oxyanion of a multivalent metal.

According to a further aspect of the invention, a polymer laminate or extrudate incoporates a laser-markable material such as an oxyanion of a multivalent metal. This is useful for producing tamper-proof labels.

According to yet another aspect of the present invention, a method for providing an image on a substrate comprises applying, to a relatively small area of the substrate, a formulation comprising a pigment and a component that forms an image on irradiation with laser light, wherein the image has greater contrast with respect to the pigment than with respect to the substrate. As in other aspects of the invention, the component may be an oxyanion of a multivalent metal.

This method allows high contrast to be achieved (typically grade A or B) between the image and its immediate background. Further, the fact that the image can be provided on demand, and is not dependent on the supply of the substrate, means that the wastage inherent in customisation can be avoided; this can lead to substantial savings in cost, for packaging produced in high volume.

DESCRIPTION OF PREFERRED EMBODIMENTS

In an oxyanion-containing compound for use in the invention, the cation may be ammonium or an alkali or alkaline earth metal, but is not critical. The oxyanion may be a molybdate, tungstate or analgous transition metal compound. Such compounds include di- and hepta-molybdates. The compound is preferably AOM; the following description refers to AOM for the purposes of illustration only. Currently, AOM is preferred because it is readily available, and is selective for a robust, low-power $CO_2$ laser operating at about 10,600 nm.

An ink formulation to be used in the invention may be water-based, solvent-based, or UV-curable, and it may be a solution or dispersion. The formulation may include a chargeable component, for use in an ink jet printer.

The binder and the AOM are intimately mixed with the solvent which may be selected from those usually used for inks and lacquers, e.g. water, ethanol, ethyl acetate, isopropyl alcohol, hydrocarbons, etc. The components may be present in solution and/or dispersion. The amount of the AOM in the ink is typically 1 to 90% by weight. The binder is typically polymeric, and may be selected from commercially-available polymers including acrylics, celluloses, PVOH, polyesters, etc. The binder preferably includes a labile group such as hydroxyl, acetoxy, ether acetal or halogen and this has the function of undergoing elimination reaction, to give a colour-forming entity (see also PCT/GB02/00862).

AOM can be incorporated into various polymer systems and milled, using a bead mill, to a desired particle size, without any technical difficulty. Examples of polymer systems in which AOM has been successfully incorporated and milled include nitrocellulose solution in alcohol/ethyl acetate, cellulose acetate propionate solution in alcohol/ethyl acetate, polyvinyl butyral soution in alcohol/ethyl acetate, solvent-based polyurethane resin, solvent-based epoxide resin, solvent-based polyester resin, water-based acrylic resin, water-based polyester resin, water-based polyurethane resin, solventless ultra violet light curable monomers and oligomers, solvent-based polyamides, solvent-based polyimides, water-based polyamides, water-based polyimides, solvent-based epoxy/vinyl/polyester coatings and lacquers, and siloxane resins.

Organic and inorganic pigments can be incorporated into AOM inks/coatings without any adverse effect on the laser markability of the AOM inks/coatings. Further, the AOM inks/coatings containing the organic and inorganic pigments can be milled to desired particle size without difficulty or adverse affect on the laser markability of AOM inks/coatings.

The AOM component may alternatively be melt-incorporated into extrudable polymers, or it may be incorporated into UV-cure monomer formulations. A film or laminate of layers which include a laser-markable component provides a tamper-proof product. Extrudable polymers which can be used in the invention include nylon, polyesters, polyamide, polycarbonate, polyacrylate, polymethacrylate, ABS graft polymers, polyolefins such as polyethylene or polypropylene, polystyrene, polyvinyl chloride, polyoxymethylene, polyimide, polyethers and polyether ketones, thermoplastic elastomers, thermoplastic polyurethane which may be used individually or as a blend of various polymers, are suitable as the polymer matrix. The amount of AOM that is incorporated is typically 0.1 to 5% by weight of the extrudate.

The AOM or analogue thereof should be laser-selective, by which is meant that it absorbs energy at a wavelength, e.g. of ~1064 nm or ~10600 nm, for which a laser can be chosen accordingly, such that it undergoes a colour change. The colour change will typically be the result of a change in valence state and/or the formation of non-stoichiometric products, although there may also be some reaction with the binder. The laser that is used can operate in either the dot matrix mode or continuous-wave, scribing mode.

The substrate may be board, e.g. cartonboard. Packaging that may be used in the invention may alternatively be in the form of a polymeric film, such as polypropylene or polyethylene, and which may be laminated and used, for example, for wrapping chocolate. If a multi-layer packaging material is used, the invention is applicable at whatever layer the ink is present.

Any pigment that is used in the invention may be conventional. A white pigment may be preferred, providing not only contrast with, say, black bar-coding but also opacity. Other colours may be chosen, as desired. Typical pigments include $CaCO_3$, ZnO, $TiO_2$ and talc.

A formulation of the invention may also include conventional components that are present in order to provide the image. Typically, they include a material that absorbs incident laser light; this material may itself change colour on absorption, or may react with another material to provide a change of colour. Typical reactants include phenols, phenolic resins, carboxylic acids together with a colour-former, e.g. Crystal Violet Lactone. Typical absorbing agents include clays, micas, $TiO_2$, carbonates, oxides, talc, silicates and aluminosilicates.

In order that the invention may be more readily understood, reference is made to the following Examples, which are intended to be illustrative of the invention, but are not intended to be limiting in scope.

EXAMPLES 1 TO 7

Solvent, water-based and UV-cure inks were formulated with ammonium octamolybdate (AOM). Lacquers were made in the proportions shown, coated onto cartonboard and dried. They were then marked using a scanning $CO_2$ laser with a beam diameter of 0.3 mm and a scan speed of 1000 mms$^{-1}$. The amounts used, and results, are shown in Table 1.

EXAMPLE 8

197 g polypropylene homopolymer was blended with 3 g of a 4:1 mixture of AOM:Iriodin 805, by mixing well on an Optiblender 2000 (Moulinex). The blend was compounded and palletised on a FOS axon extruder 11502 at temperatures of 190° C., 200° C., 210° C., 220° C. and 225° C. in the five respective zones. The moulded polymer could be marked with a $CO_2$ laser.

EXAMPLES 9 AND 10

The procedure of Example 8 was followed, but using HDPE and HIPS, respectively. The moulded polymers could be satisfactorily marked with Nd-YAG and $CO_2$ lasers, respectively.

EXAMPLE 11

An opaque white ink was formulated as below:

| | |
|---|---|
| Phenolic resin | 17% |
| Colour Former | 6% |
| Binder | 7% |
| $TiO_2$ | 6% |
| Mica | 2% |
| Water | balance |

This was printed by flexography to produce a panel on manila corrugate. The resulting white panel was exposed to the beam from a scribing $CO_2$ laser to produce a one-dimension bar code. The bar code was good quality, with class A/B verification, when the black colour former Pergascript black I-R or Pergascript black I-2R (Ciba Speciality Chemicals) was used.

EXAMPLE 12

A semi-opaque ink was formulated as described in Example 1, but without the pigment, and was gravure-printed onto white cartonboard. A scribing $CO_2$ laser was then used to produce alphanumeric and two-dimensional codes in the printed ink. The machine-readable code was of high quality when Pergascript black I-R, Pergascript Black I-2R or Pergascript Blue I-2G was used.

EXAMPLE 13

An opaque ink was formulated as in Example 11 and patches were printed by flexography onto flexible packaging film (polypropylene). Alphanumeric codes were then written into the patches using both a scribing and a dot-matrix $CO_2$ laser.

EXAMPLE 14

As in Example 13, patches were printed onto polypropylene film. The printed side of the film was then laminated with another sheet of polymeric material so that the printed patch was encapsulated. A $CO_2$ laser was then used to produce an alphanumeric code within the patch by exposure through the film.

EXAMPLE 15

A lacquer was formulated, comprising of:

| | |
|---|---|
| Polyvinyl chloride | 30% |
| Ammonium octamolybdate | 15% |
| Ethyl alcohol | balance |

This was coated down onto aluminium foil, using a Meyer bar, and dried. The semi-opaque coating was then exposed to a $CO_2$ laser beam of 0.3 mm diameter sweeping at 1000 mm/second at an output power of 3W, to produce a black image.

EXAMPLE 16

An opaque ink was formulated as given in Example 11, using a blue Colour Former but also with the addition of a small amount (0.4% by weight) of red pigment. The ink was printed by flexography onto white cartonboard, and the resulting pink panel was exposed to the $CO_2$ laser beam. The image produced was purple.

EXAMPLE 17

| | |
|---|---|
| Ammonium heptamolybdate (AHM) | 220 g |
| Nitrocellulose DLX 3-5 | 250 g |
| Ethanol | 800 g |
| Ethyl acetate | 200 g |

To a stirring solution of ethanol/ethyl acetate, nitrocellulose DLX 3-5 was added gradually. After the addition was complete the mixture was allowed stir at room temperature until a clear solution was obtained. Then a very fine powder of ammonium heptamolybdate was added portion-wise and after the addition was complete the mixture was stirred until uniform dispersion was achieved. This was coated down onto carton board, using a doctor blade, and dried. The semi-opaque coating was then exposed to a $CO_2$ laser beam of 0.3 mm diameter at a scan speed of 1000 mm/second at an output power of 3-4 W, to produce a black image.

EXAMPLE 18

| | |
|---|---|
| Texicryl 13-576 | 100 g |
| Ammonium heptamolybdate (AHM) | 20 g |
| Ammonia (25%) | 0.5 g |

To a stirring aqueous emulsion of Texicryl 13-567 (Ciba Speciality Chemicals), a fine powder of ammonium heptamolybdate was added gradually. After addition was complete, the mixture was stirred at room temperature until dissolution of ammonium heptamolybdate was obtained. This was coated down onto carton board, using a doctor blade, and dried. The semi-opaque coating was then exposed to a $CO_2$ laser beam of 0.3 mm diameter at scan speed of 1000 mm/second at an output power of 3-4 W, to produce a black image.

EXAMPLE 19

| | |
|---|---|
| Ammonium Dimolybdate (ADM) | 220 g |
| Nitrocellulose DLX 3-5 | 250 g |
| IMS | 800 g |
| Ethyl acetate | 200 g |

To a stirring solution of IMS (industrial methylated spirit)/ethanol/ethyl acetate, nitrocellulose DLX 3-5 was added gradually. After the addition was complete, the mixture was allowed to stir at room temperature until a clear solution was obtained. Then a very fine powder of ammonium dimolybdate was added portion-wise and, after the addition was complete, the mixture was stirred until a uniform dispersion was achieved. This was coated down onto carton board, using a doctor blade, and dried. The semi-opaque coating was then exposed to a $CO_2$ laser beam of 0.3 mm diameter at scan speed of 1000 mm/second at an output power of 3-4 W, to produce a black image.

EXAMPLE 20

Example 18 was repeated, using ADM instead of AHM and 0.3 g ammonia. Again, a black image was obtained.

EXAMPLE 21

Example 19 was repeated, using ammonium paratungstate (APW) instead of ADM. Again, a black image was obtained.

EXAMPLE 22

Example 20 was repeated, using APW instead of ADM. Again, a black image was obtained.

EXAMPLE 23

Example 19 was repeated, using ammonium metatungstate instead of ADM. Again, a black image was obtained.

EXAMPLE 24

Example 20 was repeated, using ammonium paratungstate instead of ADM. Again, a black image was obtained.

TABLE 1

| EXAMPLE | BINDER | QUANTITY (g) | ADDITIVE | QUANTITY (g) | SOLVENT | QUANTITY (g) | LASER MARKING POWER (W) | LASER MARKING COLOUR OF IMAGE |
|---|---|---|---|---|---|---|---|---|
| 1 | Polyvinyl alcohol (Gohsenol GH17) | 1.1 | AOM | 1 | Water | 9 | 3 | Black |
| 2 | Alcotex 395B (26%) | 12 | AOM | 2 | Methanol/methylacetate | — | 3 | Black |
| 3 | Ethyl Cellulose | 2 | AOM | 2 | Ethanol | 15 | 3 | Black |
| 4 | Klucel (hydroxy propyl cellulose) | 2 | AOM | 2 | Water | 15 | 3 | Black |
| 5 | Mowital B30H | 2 | AOM | 2 | Ethanol | 10 | 3 | Black |

TABLE 1-continued

| EXAMPLE | BINDER | QUANTITY (g) | ADDITIVE | QUANTITY (g) | SOLVENT | QUANTITY (g) | LASER MARKING POWER (W) | COLOUR OF IMAGE |
|---|---|---|---|---|---|---|---|---|
| 6 | PVC Vycar 577E | 15 | AOM | 3 | Water | 9 | 3 | Black |
| 7 | Ebecryl 657 | 3.5 | AOM | 3 | Irgacure 651 (Photoinitiator) | 0.7 | 3 | Black |
|   | Ebecryl 1608 | 3.5 |   |   |   |   |   |   |

Gohsenol was obtained from CIBA Speciality Chemicals
Alcotex was obtained from Harlow Chemicals
Klucel was obtained from Hercules
Mowital was obtained from Hoechst
Vycar was obtained from B. F. Goodrich
Ebecryl was obtained from UCB Chemicals

The invention claimed is:

1. A method for providing an image on a substrate, which comprises applying to the substrate a composition comprising a laser-markable composition which comprises a binder and ammonium octamolybdate wherein said method further comprises irradiating said composition, wherein said irradiation results in the ammonium octamolybdate providing the image.

2. The method of according to claim 1, wherein the substrate is a polymeric film.

3. The method according to claim 1, wherein the substrate is metal.

4. The method according to claim 1, wherein the substrate is paper or cartonboard.

* * * * *